United States Patent
Ichinose et al.

(10) Patent No.: US 7,891,214 B2
(45) Date of Patent: Feb. 22, 2011

(54) METHOD OF MANUFACTURING GRIN LENS AND GRIN LENS

(75) Inventors: Tomomi Ichinose, Kanagawa (JP); Toru Achiwa, Kanagawa (JP)

(73) Assignee: Toyo Glass Co., Ltd., Tokyo (JP)

( * ) Notice: Subject to any disclaimer, the term of this patent is extended or adjusted under 35 U.S.C. 154(b) by 294 days.

(21) Appl. No.: 11/992,543

(22) PCT Filed: Nov. 29, 2007

(86) PCT No.: PCT/JP2007/073029
§ 371 (c)(1), (2), (4) Date: Jul. 1, 2008

(87) PCT Pub. No.: WO2009/069208
PCT Pub. Date: Jun. 4, 2009

(65) Prior Publication Data
US 2010/0157436 A1    Jun. 24, 2010

(51) Int. Cl.
C03B 37/023 (2006.01)
G02B 3/00 (2006.01)

(52) U.S. Cl. .......................... 65/385; 359/652

(58) Field of Classification Search .............. 65/17.2, 65/37, 385, 395; 359/652, 363, 654
See application file for complete search history.

(56) References Cited

U.S. PATENT DOCUMENTS 5,439,495 A    8/1995    Koike et al.

2009/0235696 A1 *    9/2009    Ichinose et al. ............... 65/395

FOREIGN PATENT DOCUMENTS

| JP | 6-122530 | 5/1994 |
|---|---|---|
| JP | 6-321548 | 11/1994 |
| JP | 10-226524 | 8/1998 |
| JP | 2005-115097 | 4/2005 |
| JP | 2005-145751 | 6/2005 |
| WO | 2006/112003 | 10/2006 |

OTHER PUBLICATIONS

English-language machine translation of Japanese Patent Application Publication JP06-122530 (May 6, 1994), downloaded from <http://www.ipdl.inpit.go.jp/homepg_e.ipdl> on Jun. 15, 2010.*
International Search Report prepared for PCT/JP2007/073029, Jan. 15, 2008.
Korean Office Action (with English language translation) issued Jul. 16, 2009 in connection with Korean Application Serial No. 10-2008-7005504.

* cited by examiner

*Primary Examiner*—David N Spector
(74) *Attorney, Agent, or Firm*—Wenderoth, Lind & Ponack, L.L.P.

(57) ABSTRACT

The manufacture of a GRIN lens using a sol-gel process includes forming a wet gel from an alcohol solution containing a silicon alkoxide, a dopant alkoxide, and an aluminum alkoxide, first, an alcohol solution containing the silicon alkoxide and the aluminum alkoxide as is prepared, and then the dopant alkoxide is mixed thereto.

6 Claims, 1 Drawing Sheet

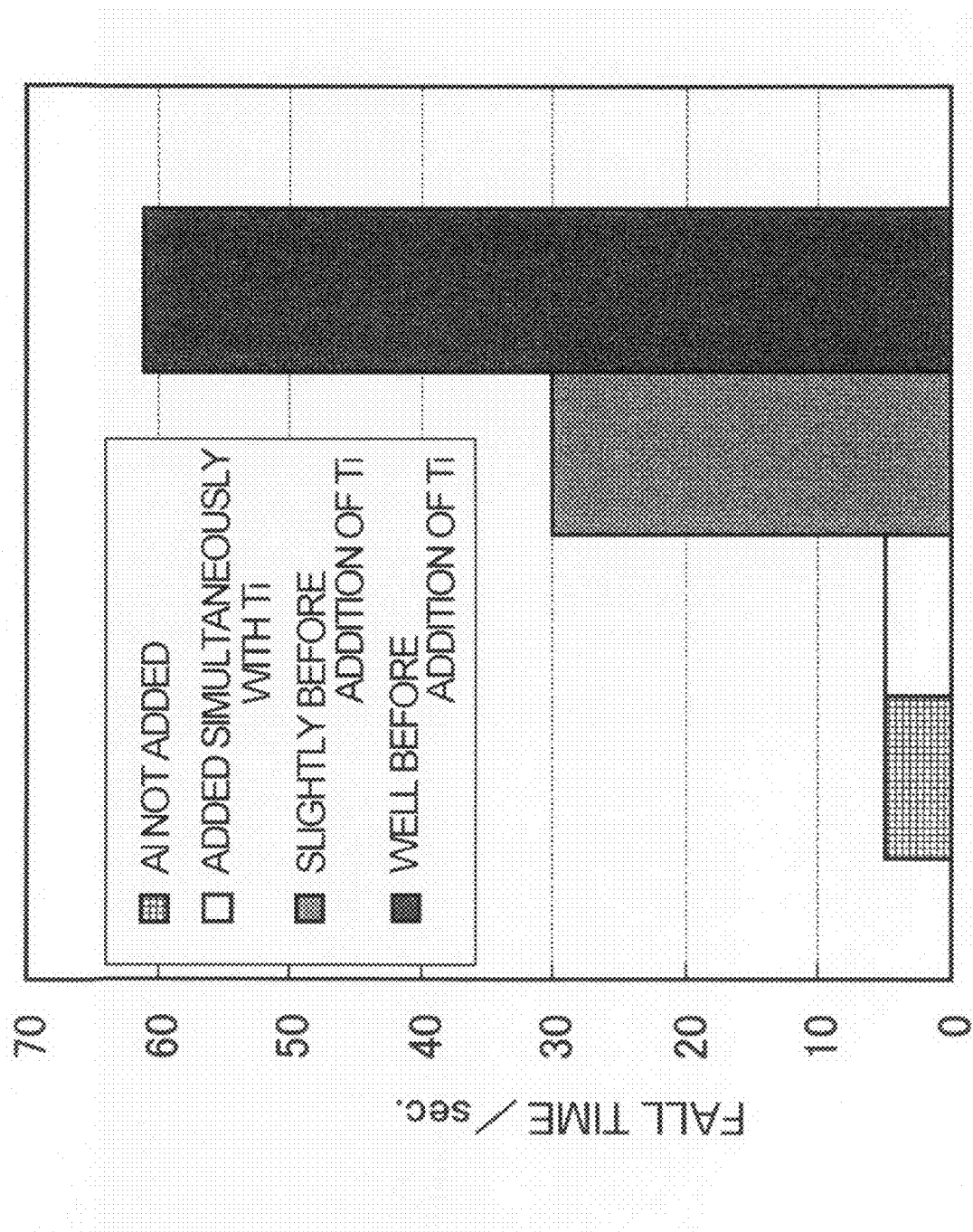

METHOD OF MANUFACTURING GRIN LENS AND GRIN LENS

BACKGROUND OF THE INVENTION

1. Technical Field

The present invention relates to a method of manufacturing a GRIN lens using a sol-gel process, and a GRIN lens that can be manufactured by the manufacturing method.

2. Background Art

Optical fiber collimators, each including a GRIN lens (Graded Index Lens) fusion-spliced with an end of an optical fiber, can connect semiconductor lasers to optical fibers with high efficiency and can be used as connectors with low coupling loss, or the like, thus being useful as various optical communication parts.

As a method for manufacturing such a GRIN lens, an ion-exchange process, a vapor phase CVD process, or the like is known. A sol-gel process based on low-temperature synthesis is considered to be excellent. For example, Patent Documents 1 to 3 described below each disclose a method for manufacturing a GRIN lens using a sol-gel process. In the method, an acid or base as a solvent is added to an alcohol solution containing a silicon alkoxide ($Si(OR)_4$ (R: alkyl group)) as a main component, hydrolysis is performed to form a sol, and the sol is further subjected to polycondensation, followed by aging, to generate a crosslinking reaction, thereby forming a wet gel. In the production of a GRIN lens, it is necessary to form a concentration distribution in a dopant (i.e., metal component that provides a refractive index distribution). In a portion having a higher concentration of the dopant, the refractive index is higher. Consequently, the GRIN lens is produced such that the central portion has a high concentration of the dopant, and the concentration decreases toward the outer surface. In one method, a metal alkoxide or a metal salt is used as a material for the dopant. Furthermore, a molecular stuffing technique may be used. In particular, use of an alkoxide of Ti, Ta, Sb, or Zr is significantly useful. In order to form a concentration distribution, leaching is generally performed. In the leaching, a wet gel is immersed in an acid solution, and the dopant in the peripheral portion is dissolved away, thus providing a concentration distribution. The resulting wet gel is dried, the solvent in the gel is removed, and then firing is performed to produce a cylindrical, dense glass preform provided with a refractive index distribution. The resulting glass preform is subjected to wire-drawing to reduce its diameter, and thereby, a GRIN lens is produced.

Furthermore, Patent Document 3 described below discloses a technique in which, in the formation of a wet gel, a mixture of a titanium alkoxide and an aluminum alkoxide is added to an alcohol solution containing a silicon alkoxide as a main component to form a wet gel containing aluminum.

Patent Document 1: Japanese Unexamined Patent Application Publication No. 2005-115097

Patent Document 2: Japanese Unexamined Patent Application Publication No. 2005-145751

Patent Document 3: Japanese Unexamined Patent Application Publication No. 6-122530

In a conventional general sol-gel process, a preform is formed using two components, i.e., silicon and a dopant (for example, when the dopant is Ti, $SiO_2$—$TiO_2$).

In the production of a preform and a lens obtained by wire-drawing the preform, in the case where the dopant concentration is about 10 mole percent, the preform is easily broken during sintering, and the yield in the sintering process is significantly low, which is a problem. Furthermore, in the case where the dopant concentration is 10 mole percent or more, the viscosity at the temperature at which wire-drawing is performed is low, and it becomes difficult to operate, thus decreasing the yield, which is also a problem.

Furthermore, in a GRIN lens having a high numerical aperture with a dopant concentration of 18 mole percent or more, a marked phase separation occurs in the preform during sintering, and it is difficult to obtain a transparent GRIN lens.

One of the means for overcoming such problems is a method in which the composition of the preform is changed from two components to three or more components. In Patent Document 3 described above, aluminum, boron, or germanium is added as a third component. However, many components suitable as the third component are susceptible to acids. Even when an alkoxide is added to a wet gel, most of the alkoxide added is dissolved away by an acid for leaching, and it is difficult to allow an effective amount of the alkoxide to remain in the glass preform.

SUMMARY OF THE INVENTION

It is an object of the present invention to provide a method for manufacturing a GRIN lens using a sol-gel process, in which breaking and phase separation of a preform are prevented during sintering of a dry gel, and the viscosity of a glass during wire-drawing is increased so that the wire-drawing operation is facilitated and the yield is improved.

A method for manufacturing a GRIN lens according to the present invention is characterized by including a step of forming a wet gel from an alcohol solution containing, as main components, a silicon alkoxide, a dopant alkoxide, and an aluminum alkoxide, a step of dissolving by leaching the dopant and aluminum away from the outer peripheral surface of the wet gel to provide a refractive index distribution, a step of forming a dry gel by drying the wet gel, a step of forming a glass preform by firing the dry gel, and a step of wire-drawing the preform. In the step of forming the wet gel, the alcohol solution is prepared by first forming an alcohol solution containing the silicon alkoxide and the aluminum alkoxide as main components, and then mixing the dopant alkoxide thereto.

In the process of forming the wet gel, preferably, the alkoxides as starting materials are added in the order of the silicon alkoxide, the aluminum alkoxide, and the dopant alkoxide. When the aluminum alkoxide and the dopant alkoxide are added to the silicon alkoxide, if the aluminum alkoxide and the dopant alkoxide are simultaneously added, or if the aluminum alkoxide is added after the dopant alkoxide is added, the dopant alkoxide having a higher reaction rate is preferentially bonded to the silicon alkoxide, and the aluminum alkoxide hardly contributes to the crosslinking structure of the gel or can only be weakly bonded in the crosslinking structure. When leaching is performed, aluminum is easily dissolved away from such a wet gel by an acid. As a result, it is not possible to allow aluminum with a significant concentration to remain in the glass. Consequently, this point is important in particular in the case where aluminum is added for the purpose of suppressing phase separation.

In the step of forming the wet gel, the amount of the aluminum alkoxide added is preferably set so that the concentration of elemental aluminum is 2 to 20 mole percent on the basis of (elemental silicon+elemental dopant+elemental aluminum).

If the amount is less than 2 mole percent, the amount of aluminum remaining in the glass perform decreases, and the effect of preventing breaking and the effect of suppressing phase separation during sintering are decreased.

If the amount exceeds 20 mole percent, gelation may occur during preparation of the sol (in the stage where alkoxides or alcohols are being mixed), and there may be a possibility that a wet gel cannot be formed.

In the present invention, the dopant may be one or two or more selected from the group consisting of Ti, Ta, Sb, and Zr. These metals are highly capable of increasing the refractive index, have a coefficient of thermal expansion close to that of silica glass, and alkoxides thereof easily dissolve in an alcohol, thus being excellent as a dopant of the present invention. Furthermore, Sb tends to evaporate in the sintering process of the gel, and Zr precipitates in the process of forming the wet gel, although in a small amount, in an alcohol which is a solvent, thus being unstable in terms of the process. Consequently, Ti and Ta are most desirable as the dopant.

A GRIN lens according to the present invention is characterized by including a silicon oxide, a dopant oxide, and an aluminum oxide, wherein the concentration of elemental aluminum (aluminum content) is 0.04 mole percent or more on the basis of (elemental silicon+elemental dopant+elemental aluminum).

In the method for manufacturing a GRIN lens according to the present invention, aluminum is suppressed from being dissolved away in the leaching step, and it is possible to obtain a glass preform containing a significant amount of aluminum. Since breaking and phase separation of glass during sintering can be suppressed by aluminum, a transparent glass preform can be obtained with high yield. Furthermore, since the viscosity of glass during wire-drawing is controlled so that operation is facilitated, the yield is greatly improved in the production of the GRIN lens. In order to suppress the breaking of the preform and in order to sufficiently suppress the phase separation, preferably aluminum remains in an amount of 0.04 mole percent or more in terms of elemental aluminum.

In the GRIN lens of the present invention, because of the aluminum remaining in the interior thereof, the effects described below are achieved.

(1) Facilitation of Wire-Drawing Operation Due to Increase in Viscosity.

The viscosity of glass is increased by the aluminum slightly remaining in the glass preform. Therefore, it is possible to reach the proper state (a state in which wire-drawing can be performed stably to achieve a desired thickness) easily and in a short period of time from the start of the wire-drawing operation, the amount of yield increases, and the yield in the wire-drawing process is improved.

(2) Suppression of Breaking During Sintering.

The amount of breaking of the preform during sintering is decreased to almost zero by the aluminum slightly remaining in the glass preform, and the yield is greatly improved in the sintering process. Although the reason for this is not entirely clear at the present time, it is assumed that, by the action of the aluminum, differences in the shrinkage ratio and thermal expansion ratio between the outer portion and the central portion of the preform are reduced.

(3) Suppression of Phase Separation During Sintering

When a GRIN lens having a high numerical aperture with a dopant concentration in the wet gel exceeding 18 mole percent is produced, the glass preform becomes cloudy due to phase separation. As a result, it is not possible to obtain a transparent GRIN lens. By incorporating aluminum, phase separation is suppressed, and it is possible to obtain a colorless and transparent GRIN lens having a high numerical aperture with high yield.

In the GRIN lens of the present invention, because of the incorporation of aluminum, the steps of sintering and wire-drawing can be carried out with high yield. Furthermore, since the phase separation is suppressed, it is possible to have a product which has a high numerical aperture, which is colorless, and which has high light transmission. Consequently, it is possible to produce a GRIN lens having a very high numerical aperture with a dopant concentration in the wet gel exceeding 18 mole percent, which was conventionally impossible to achieve.

BRIEF DESCRIPTION OF DRAWINGS

FIG. 1 is a graph illustrating the tendency of viscosity with respect to preforms prepared in different orders of addition of aluminum alkoxide.

DETAILED DESCRIPTION OF THE INVENTION

Example 1

Case of Slightly High Numerical Aperture (Titanium Concentration 10% and Aluminum 5% in the Preparation of Wet Gel)

To a mixed solution of 43.13 g of tetramethoxysilane (TMOS), 26.11 g of ethanol, and 6.09 g of dimethylformamide (DMF), 5.21 g of a 0.54 mol/l hydrochloric acid was added, followed by mixing. Then, 5.04 g of an aluminum chelate (aluminum disecondary butoxide acetoacetic ester chelate), 7.68 g of ethanol, and 6.09 g of DMF were added to the mixture, and further 11.35 g of titanium tetra-n-butoxide, 15.36 g of ethanol, and 12.18 g of DMF were added thereto. Furthermore, stirring was performed while gradually adding 18.62 g of ethanol and 18.04 g of pure water. Thereby, a wet gel including 85 mole percent of silicon, 10 mole percent of titanium, and 5 mole percent of aluminum was obtained. The resulting wet gel was aged at 60° C. for 6 days.

Subsequently, the wet gel was immersed in a 1.5 mol/l hydrochloric acid for 16 hours, and leaching was performed in which titanium and aluminum were dissolved away from the peripheral portion to impart a titanium concentration distribution to the gel.

Subsequently, the wet gel was dried at 70° C. for 4 days and at 120° C. for 3 days. Thereby, a dry gel with a diameter of about 7 mm was obtained.

The resulting dry gel was heated from room temperature to 550° C. in an oxygen atmosphere at 9° C./hr, and then to 1,250° C. in a helium atmosphere at 7° C./hr to perform firing. Thereby, a transparent glass preform was obtained. In the firing step, no breaking or foaming occurred in the glass preform, and the yield was 100%.

The cylindrical glass preform was wire-drawn to a GRIN lens with a diameter of 125 μm. In the wire-drawing step, no foaming was observed, and it was possible to obtain a transparent GRIN lens with a yield of 100%.

Additionally, in the case where a conventional production method is used in which aluminum is not incorporated, the yield in the firing process is about 30% due to breaking.

Example 2

Case of High Numerical Aperture (Titanium Concentration 20% and Aluminum 5% in the Preparation of Wet Gel To a mixed solution of 38.06 g of tetramethoxysilane (TMOS), 17.28 g of ethanol, and 6.09 g of dimethylformamide (DMF), 4.513 g of a 0.06 mol/l hydrochloric acid was added, followed by stirring. Then, a mixed solution of 5.04 g of aluminum chelate, 9.21 g of ethanol, and 6.09 g of DMF was added thereto, and a mixed solution of 22.69 g of titanium tetra-n-butoxide, 23.03 g of ethanol, and 12.18 g of DMF was added thereto. Furthermore, stirring was performed while gradually adding 19.58 g of ethanol and 19.22 g of pure water. Thereby, a wet gel including 75 mole percent of silicon, 20 mole percent of titanium, and 5 mole percent of aluminum was obtained. The resulting wet gel was aged at 60° C. for 20 days.

Subsequently, the wet gel was immersed in a 3 mol/l hydrochloric acid for 4.5 hours, and leaching was performed in which titanium and aluminum were dissolved away from the peripheral portion to impart a titanium concentration distribution to the gel.

Subsequently, the wet gel was dried at 70° C. for 4 days and at 120° C. for 3 days. Thereby, a dry gel with a diameter of about 7 mm was obtained.

The resulting dry gel was heated from room temperature to 550° C. in an oxygen atmosphere at 9° C./hr, and then to 1,250° C. in a helium atmosphere at 7° C./hr to perform firing. Thereby, a transparent glass preform was obtained. In the firing step, no breaking or foaming occurred in the glass preform, and the yield was 100%. The glass preform had a square distribution, in which the concentration of titanium was 18 mole percent in the central portion and 3 mole percent in the peripheral portion, and the concentration of aluminum was 0.1 mole percent in the central portion and 0.05 mole percent on an average.

The cylindrical glass preform was wire-drawn to a GRIN lens with a diameter of 125 μm. As a result, a transparent GRIN lens was obtained, and its numerical aperture NA was 0.55.

Furthermore, the time required in which the preform was softened in a wire-drawing furnace and fell a certain distance under its own weight was about 60 seconds, which indicated a viscosity suitable for operation.

Comparative Example

When a glass preform was produced by a conventional production method in which alkoxides were added in an arbitrary order, the amount of the aluminum oxide remaining in the glass preform was less than 0.01 mole percent on an average. In the glass preform, a significant phase separation occurred, and, in addition, the time required in which the preform was softened in a wire-drawing furnace and fell was less than 5 seconds. That is, the viscosity was low, thus being inoperable. Therefore, it is not possible to manufacture a product that can be used as a GRIN lens.

FIG. 1 shows a change in viscosity with respect to the order of addition of aluminum alkoxide in preforms obtained from a dry gel with a titanium concentration of 20 mole percent and an aluminum concentration of 5 mole percent shown in Example 2. In the graph, the checkered bar shows the case described in Comparative Example where aluminum was not added, the white bar shows the case where the aluminum alkoxide and the titanium alkoxide were added simultaneously, the gray bar shows the case where the aluminum alkoxide was added slightly before the addition of the titanium alkoxide, and the black bar shows the case where the aluminum alkoxide was added well before the addition of the titanium alkoxide. The viscosity was evaluated by measuring the fall time in which, under a common downward load, a sample was softened at the wire-drawing temperature and fell a certain distance. As is evident from the graph, the viscosity varies depending on the procedure used for addition of aluminum.

In the method for manufacturing a GRIN lens according to the present invention, in the step of forming the wet gel, other additives may be added. For example, it may be possible to add acetylacetone as a stabilizer for titanium so that the titanium alkoxide is suppressed from being crystallized during preparation of the sol. Furthermore, a phosphorus alkoxide, a boron alkoxide, or the like may be added. By adding additives, such as boron and phosphorus, the thermal expansion ratio of the glass, the shrinkage ratio during sintering, the phase separation region in the glass, the softening point, etc. can be controlled to a certain extent.

The GRIN lens of the present invention may include, in addition to the silicon oxide, the dopant oxide, and the aluminum oxide, small amounts of other oxides. For example, if a phosphorus alkoxide, a boron alkoxide, or the like is added in the step of forming the wet gel, although boron, phosphorus, or the like is dissolved away in the leaching step, it is possible to obtain a GRIN lens containing a small amount of boron, phosphorus, or the like.

In the present invention, the silicon alkoxide, the dopant alkoxide, and the aluminum alkoxide are not limited to those described in Examples, and other alkoxides may be used.

The invention claimed is:

1. A method of manufacturing a GRIN lens comprising:
   forming a wet gel from an alcohol solution containing a silicon alkoxide, a dopant alkoxide, and an aluminum alkoxide;
   dissolving by leaching the dopant and aluminum away from an outer peripheral surface of the wet gel to provide a refractive index distribution;
   forming a dry gel by drying the wet gel;
   forming a glass preform by firing the dry gel; and
   wire-drawing the preform,
   wherein, during said forming the wet gel, the alcohol solution is prepared by first forming an alcohol solution containing the silicon alkoxide and the aluminum alkoxide, and then mixing the dopant alkoxide thereto.

2. The method of manufacturing a GRIN lens according to claim 1, wherein the dopant is at least one selected from a group consisting of Ti, Ta, Sb, and Zr.

3. The method of manufacturing a GRIN lens according to claim 1, wherein a concentration of elemental aluminum contained in the dry gel formed during said forming the dry gel is 0.04 mole percent or more based on (elemental silicon+elemental dopant+elemental aluminum).

4. The method of manufacturing a GRIN lens according to claim 3, wherein the dopant is at least one selected from a group consisting of Ti, Ta, Sb, and Zr.

5. The method of manufacturing a GRIN lens according to claim 1, wherein a concentration of elemental aluminum contained in the alcohol solution during said forming the wet gel is 2 to 20 mole percent based on (elemental silicon+elemental dopant+elemental aluminum).

6. The method of manufacturing a GRIN lens according to claim 5, wherein the dopant is at least one selected from a group consisting of Ti, Ta, Sb, and Zr.

* * * * *